No. 722,599. PATENTED MAR. 10, 1903.
B. J. MATTESON.
COKE DRAWING MACHINE.
APPLICATION FILED AUG. 5, 1902.
NO MODEL. 5 SHEETS—SHEET 4.
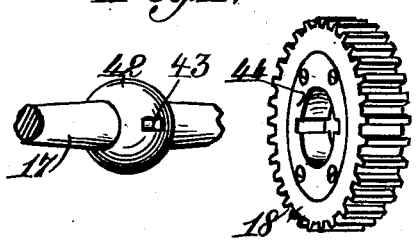
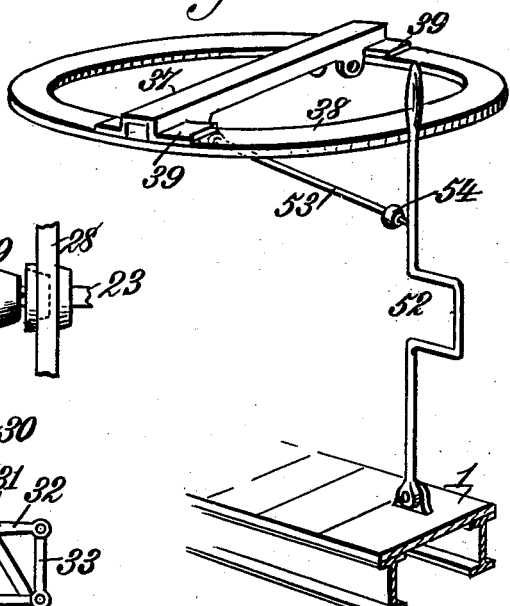
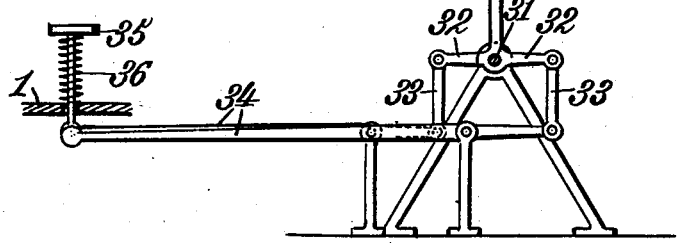
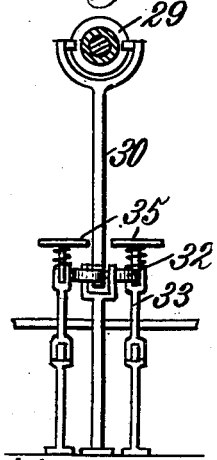
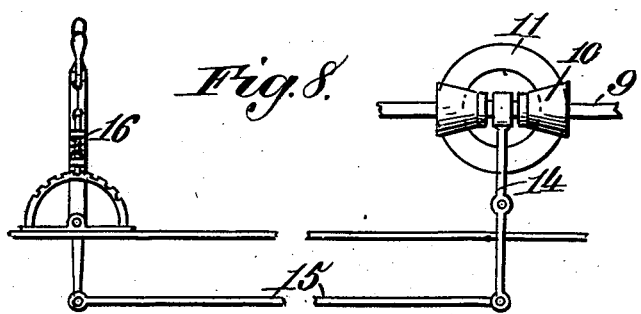
Witnesses,
Robert Everett,
W. B. Keefer
Inventor:
Burton J. Matteson
By James L. Norris,
Atty.

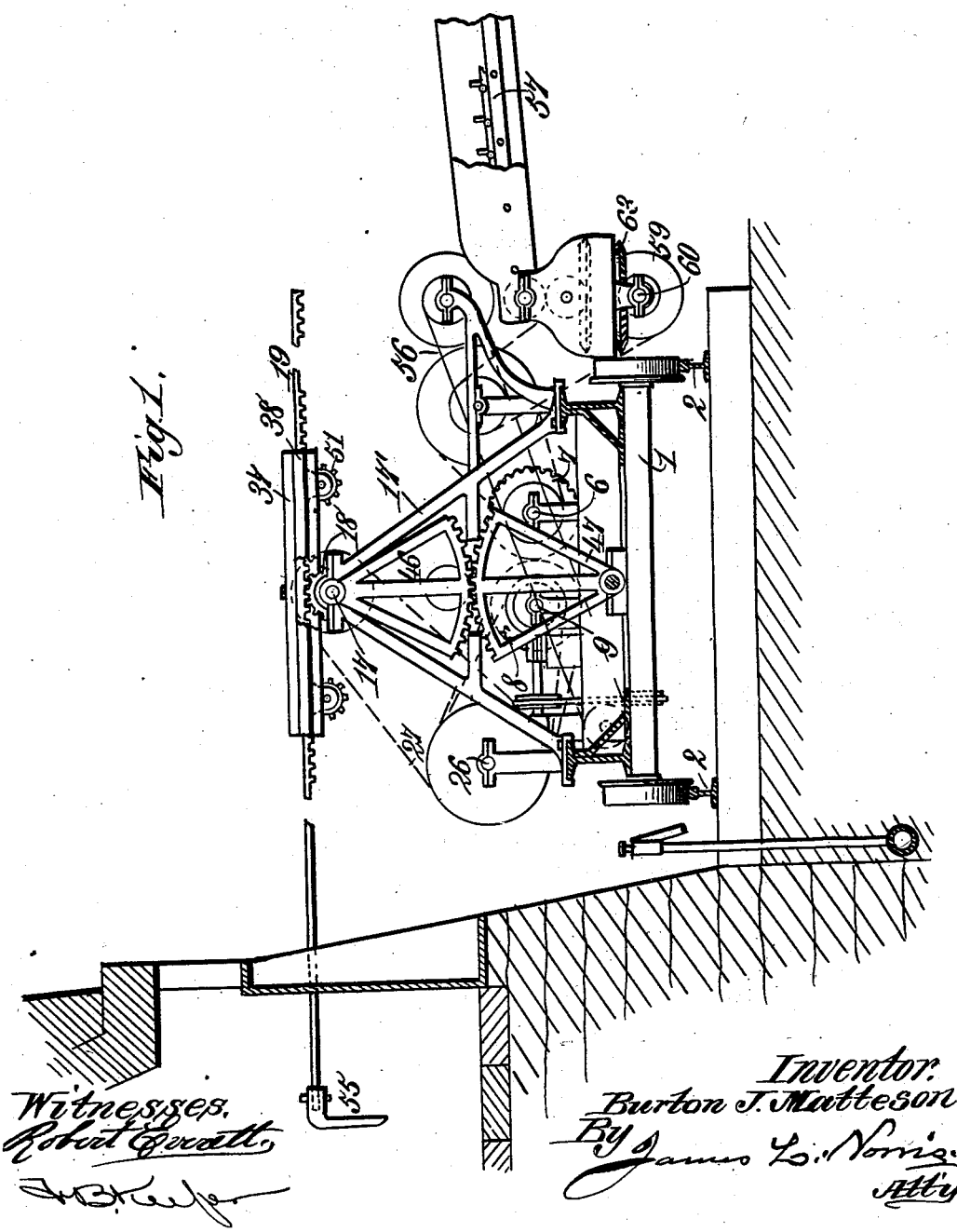

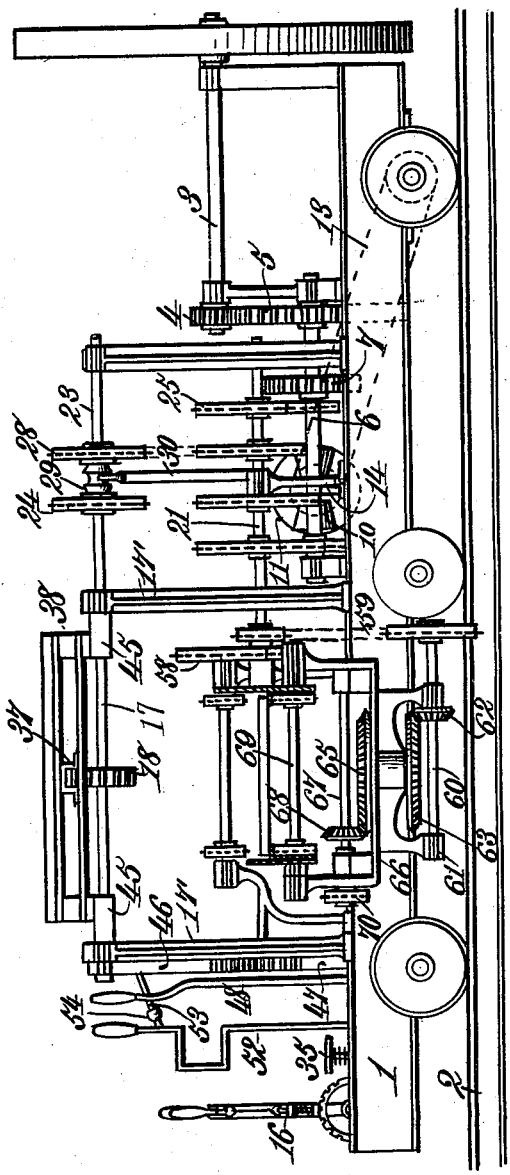

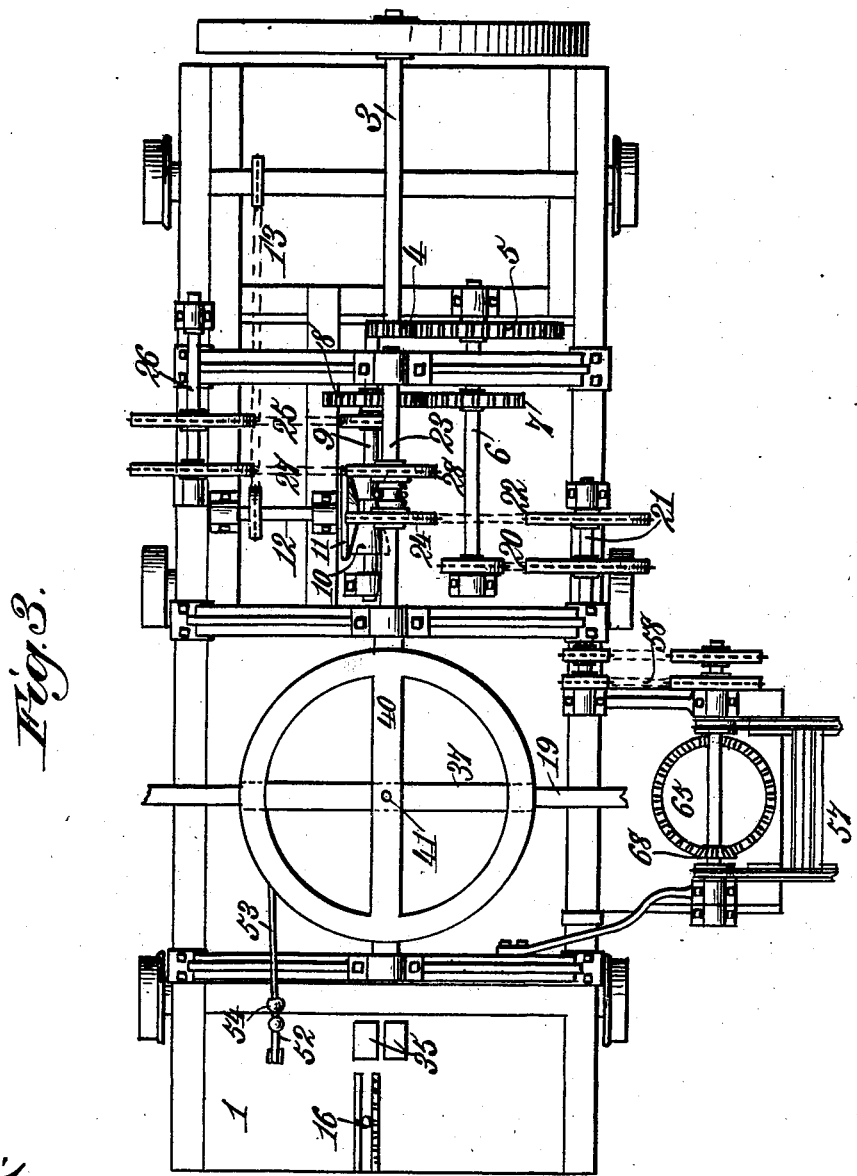

No. 722,599. PATENTED MAR. 10, 1903.
B. J. MATTESON.
COKE DRAWING MACHINE.
APPLICATION FILED AUG. 5, 1902.
NO MODEL. 5 SHEETS—SHEET 5.
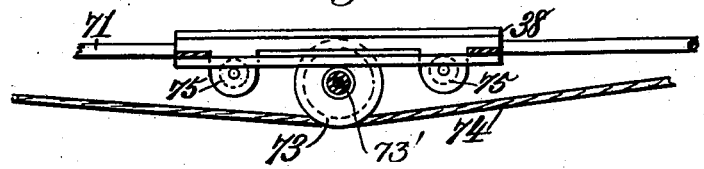
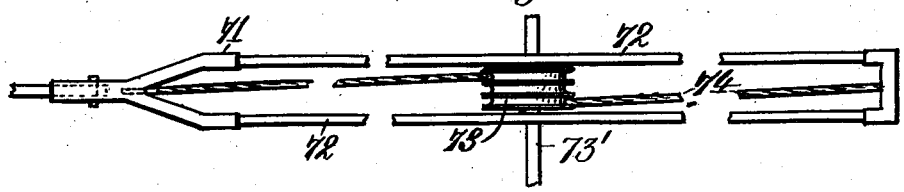
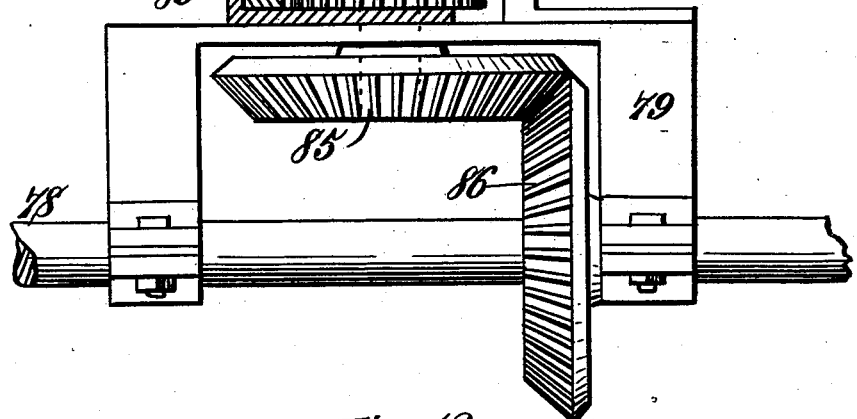
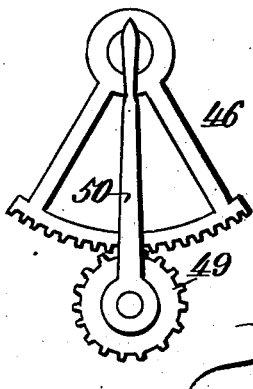
Witnesses.
Inventor.
Burton J. Matteson
By James L. Norris
Atty.

UNITED STATES PATENT OFFICE.

BURTON J. MATTESON, OF TRINIDAD, COLORADO.

COKE-DRAWING MACHINE.

SPECIFICATION forming part of Letters Patent No. 722,599, dated March 10, 1903.

Application filed August 5, 1902. Serial No. 118,535. (No model.)

*To all whom it may concern:*

Be it known that I, BURTON J. MATTESON, a citizen of the United States, residing at Trinidad, in the county of Las Animas and State of Colorado, have invented new and useful Improvements in Coke-Drawing Machines, of which the following is a specification.

This invention relates to a coke-drawing machine; and the objects of the invention are to provide an effective apparatus of this character which can be readily propelled in different directions, and which has a drawing member operable to remove the coke from all parts of the oven and deliver the same onto conveying mechanism forming a part of the machine, and which is so arranged as to deliver said coke into a car or any other desired place, and the several operations are all under the easy control of an operator.

I will hereinafter describe in detail the machine in one convenient embodiment thereof, it being understood, of course, that the invention is not limited to the parts nor to their arrangement in the manner indicated in the description, for many variations as to these points may be adopted within the scope of the claims succeeding such description.

The improved machine is clearly shown in the accompanying drawings, forming a part of this specification, and in which—

Figure 1 is an end elevation of said machine, showing the same in adjacence to a coke-oven. Fig. 2 is a side elevation as seen from the right in Fig 1. Fig. 3 is a plan view of the same. Fig. 4 is a detail perspective view of a pinion and a portion of the shaft carrying the same, the two parts being separated. Fig. 5 is a similar view of a rack and its carrier and shifting device. Fig. 6 is an elevation of the mechanism for effecting the reciprocation of the draw-bar. Fig. 7 is a similar view as seen from the left in Fig. 6. Fig. 8 is a like view with the mechanism for controlling the direction of movement of the truck carrying the different parts of the apparatus. Figs. 9 and 10 are details, respectively in sectional elevation and plan, of a modified form of mechanism for effecting the reciprocation of the draw-bar. Fig. 11 is a sectional elevation of a second modification of the same. Fig. 12 is a detail view of a modification for securing the tilting movement of the carrier for the draw-bar.

Like characters refer to like parts in all the figures of the drawings.

The improved apparatus includes in its organization a wheeled truck 1, the wheels of which are adapted to travel upon the rails 2, laid along the front of the battery of coke-ovens, as shown in Fig. 1, and said truck has of course a deck or platform upon which the operator or operators can stand and constitutes a framing for sustaining the different parts of the machine.

The truck 1, which is adapted to be propelled back and forth along the track so that the draw-bar carried thereby can successively effect the discharge of the coke from the several ovens, is adapted to sustain at one end thereof a motor of some suitable kind, which I have not deemed it necessary to show. I have, however, represented the motor or engine shaft, the same being denoted by 3 and being sustained by suitable bearings upon the deck or platform of the car or truck and carrying at one end the usual fly-wheel.

The several mechanisms are operated through suitable connections from the motor-shaft 3, and they may be of any suitable kind. I will first describe the mechanism for propelling the truck or car, the same including instrumentalities for securing the movement of the truck in opposite directions. The motor-shaft 3 fixedly carries at its inner end the pinion 4, meshing with the gear 5, suitably fastened to the main shaft 6, supported by suitable bearings upon the truck. The shaft 6, intermediate its ends, has rigidly secured thereto the gear 7, meshing with the gear 8, of like size, fastened suitably to the shaft 9.

A duplex cone is shown at 10, the same being feathered on the shaft 9 and its respective and oppositely-inclined sections being adapted to alternately engage the working surface of the cone 11, suitably secured to the inner end of the shaft 12, connected by sprocket-gearing 13 with one of the axles of the truck or car 1. The duplex cone 10 is adapted to be shifted by a lever 14, fulcrumed intermediate its length to a suitable bracket upon the truck and connected at its lower end with a rod 15, jointed to the lower end of the hand-lever 16, which is held in the adjusted position by means of the usual detent and sector. In Fig. 8 the hand-lever is shown as being in its intermediate position, at which time neither of the parts of the duplex driving-cone 10 is in contact with the driven cone 11. By shifting the lever 16, however, to the right or left, as the case may be, one or the other of the sections of the duplex cone will be put into working relation with the cone 11, so as to propel the truck through the hereinbefore-described connections. If the section of the cone 10 on the right be in engagement with the cone 11 to drive the truck in one direction and it be desired to reverse this movement, this can be accomplished by moving the other section of the cone 10 into contact with the cone 11, and of course the truck can be stopped in front of an oven by moving both sections of the cone 10 out of engagement with the cone 11, which operation is effected by the manipulation of the hand-lever 16.

Referring now more particularly to Fig. 1, the numeral 17 denotes a shaft sustained by the vertically-disposed A-shaped standards 17', which is adapted to be oppositely rotated, as will hereinafter appear, and which carries a power-transmitting member, as the pinion 18, for transmitting reciprocatory motion to the draw-bar 19, the latter having along its under side for a suitable distance rack-teeth adapted to mesh with those of the pinion, and the pinion is connected to its shaft by a ball-and-socket joint, as will hereinafter appear, so that the draw-bar can be shifted relatively to the shaft 17 without affecting the driving connection between said shaft and its pinion. The shaft 6 is connected by sprocket-gearing 20 with a counter-shaft 21, which is connected by similar gearing 22 with a shaft 23, the terminal sprocket gear or wheel being denoted by 24, as shown most clearly in Fig. 3. Said shaft 9 is connected by sprocket-gearing 25 with the counter-shaft 26, it being seen that said counter-shafts are supported on opposite sides of the machine. The said shaft 26 is connected by sprocket-gearing 27 with the shaft 23, the terminal sprocket gear or wheel being denoted by 28. All the sprocket wheels or gears, except the terminal ones, are fixed upon their shafts, and it will be evident that by virtue of the connections the sprocket-wheels 24 and 28 will be oppositely rotated, and the parts should be so proportioned that such sprocket-wheels 24 and 28 will be rotated at the same speed. These sprocket-wheels through the agency of the clutch 29, which is keyed to the shaft 23 for sliding movement, are adapted to be alternately clutched or coupled to the shaft 17 for effecting the movement of said shaft, and hence of the draw-bar 19, in opposite directions.

Referring now to Fig. 6, it will be seen that the clutch 29 has oppositely-inclined cone portions adapted to alternately fit into similar-shaped seats or sockets in the sprocket-wheels 24 and 28, and said clutch is adapted to be operated by the lever 30, the same having at its upper end the usual fork adapted to fit in a peripheral channel in the clutch-body. It will be understood that when the clutch 29 is in driving engagement with the sprocket-wheel 24 the shaft 23 will be driven in one direction, and the reverse direction will be followed when the said clutch is put into contact with the other sprocket-wheel. The lever 30 is rigidly secured to a suitably-supported rock-shaft 31, from which horizontal arms 32 extend oppositely, said arms being connected by depending links 33 with the parallel levers 34, the said shaft 31 and levers 34 being carried by suitable uprights upon the truck. The inner ends of the parallel levers 34 are connected with depending stems of the treadles 35, which are normally upheld by coiled springs 36, bearing against the under sides of said treadles and also against the floor of the truck, said treadles being arranged side by side in adjacence. It will be seen that one of the links is connected with its lever at a point beyond or to the right of its fulcrum, while the other link is united to its lever at a point between the fulcrum thereof and the actuating-treadle, the result being that the shipping-lever 30 is operated in one direction by power applied to a treadle 35 and in the opposite directions through the intermediate connections by power applied to the other treadle. The treadles are shown as occupying their elevated positions in Fig. 6, and when they are alternately depressed the springs thereof are put under compression, so that when the foot is taken from the treadle the latter is instantly returned to its upper position by the force of the relaxing-spring. The draw-bar 19 is reciprocatory between the side walls of a boxing or guide 37 of inverted-channel form and which is slidable between the superposed rings 38, suitably united. The draw-bar guide or boxing 37 has a turning movement between the superposed upper rings 38, constituting a suitable carrier for said boxing, and the lower ring is in the nature of a track or turn-table for said boxing, the latter having angular flanges or feet 39 at its opposite ends adapted to travel upon said lower ring. A strap 40 is supported by the upper ring 38 in a direction crosswise to the boxing 37, and it is adapted to centrally receive the pivot 41, which may be a bolt or rivet and which extends through the cross-bar of the upper ring and also through the top of the channeled guide or boxing 37, the strap and pivot constituting a suitable means to pivotally secure the boxing or guide in place. The boxing is adapted to be moved upon the lower ring or track 38 by suitable means, as will hereinafter appear.

The pinion 18 is connected to its shaft 17 by a ball-and-socket union, one simple form of which will now appear. The shaft 17 is provided with a spherical portion 42, adapted to fit in a similar-shaped seat in the pinion 18, said spherical portion 42 having oppositely-disposed keys or pins 43, adapted to fit keyways or grooves in the wall of the spherical socket or seat, by reason of which the pinion can be shifted laterally on the shaft without affecting the driving connection between said parts. The parts are so constructed that the pinion can have a movement of at least one hundred degrees, so as to secure a considerable range of lateral movement for the draw-bar. The pinion 18 is shown as split in order that it may be fitted to the spherical portion 42, and the two sections of the same are held together by plates or rings 44, countersunk in the opposite faces of said pinion. The superposed rings 38, which, it will be understood, are in the nature of a unitary structure, have at diametrically opposite sides and below the lower ring the sleeves 45, supported for oscillation in the upper ends of the A-shaped bearings 17', one of the sleeves extending entirely through its bearing and having rigidly secured thereto the depending sector 46, meshing with a like sector 47, suitably pivoted at its lower end. The hand-lever 48 is fulcrumed at its lower end to a bearing upon the floor or platform of the truck 1 and is connected in some suitable manner between its ends to the lower sector 47, so as to oscillate the latter. By operating the lower sector it will be apparent that the upper one will also be operated so that the superposed rings 36 can be given a tilting movement, so as to impart a like movement to the draw-bar carried between the same, said draw-bar being capable also of lateral motion, as hereinbefore set forth. By these two movements of the draw-bar, therefore, it is possible to reach all parts of the oven for effecting the complete discharge of the same. Instead of tilting the carrier for the draw-bar by the intermeshing sector-gear I can accomplish this result by the mechanism shown in Fig. 12, the sector 46 in this case meshing with the pinion 49, suitably supported to the shaft to which the hand-lever 50 is suitably fastened.

To uphold the draw-bar the guide or boxing 37 therefor has supported below the same in some convenient manner pinions 51, the teeth of which are adapted to mesh with those of the draw-bar at points at opposite sides of the main pinion 18.

What I term the "tilting" movement of the draw-bar is secured by the meshing sectors or sector and pinion hereinbefore described. I will now set forth a means for securing the lateral movement of the same.

A hand-lever is shown at 52, it being fulcrumed at its lower end to a suitable bearing upon the truck and having between its ends a crank portion, so that the lever can be operated without the same striking the cross-bar of the adjacent and substantially A-shaped standard 17'. A link 53 is connected at its opposite ends by ball-and-socket joints or other universal connections, as at 54, with the hand-lever 52 and boxing or guide 37, respectively, and by virtue of these connections it will be evident that the draw-bar can be freely tilted without moving the hand-lever 52. By manipulating said hand-lever, however, the boxing 37 through the intermediate link can be swung around in either direction, so as to secure what may be considered the lateral motion of the draw-bar. As the draw-bar 19 is moved laterally the teeth thereof, being in mesh with the pinion 18, will carry said pinion in the corresponding direction, so that the driving relation between the pinion and rack-teeth will be maintained under all conditions within the limits of the lateral motion of the said draw-bar.

The draw-bar is shown as provided at its inner end with the drawing implement or hoe 55, socketed thereon and held in place by a wedge pin or key, so that the said hoe can be removed for the purpose of substituting therefor a rake, which I have not shown. At the commencement of operation the rake is applied to the draw-bar, and the same works up and down and sidewise, so as to loosen up the coke, and when this has been accomplished the rake is detached and the drawing implement or hoe put upon the draw-bar, so as to effect the discharge of the coke. When the draw-bar is given an outward movement, the drawing implement thereon is adapted to pull out the coke through the door of the oven, and the same drops onto a primary conveyer 56, which delivers it onto a secondary conveyer 57, the latter in turn carrying the coke into a car or otherwise disposing of the same. As the primary conveyer has no movement relatively to the truck, the shafts thereof are carried by fixed bearings of some suitable kind upon the said truck. These conveyers may be of any desirable length or width and of such a construction as will secure the sifting of the coke while upon the upper or working runs thereof. Any of the well-known forms of conveyers now on the market can be utilized for this purpose. The secondary conveyer, as will hereinafter appear, has a lateral movement relatively to the truck in order that the discharge end of the same conveyer can be moved from place to place. The primary conveyer upon which the coke is initially placed is driven as follows: The counter-shaft 21 is connected by sprocket-gearing 58 with the outermost shaft of the said primary conveyer.

The mechanism for operating the secondary conveyer should be such as will permit the same to move laterally without affecting the driving connections of the same, as will now appear.

The shaft 21 is connected by sprocket-gearing 59 with the shaft 60, supported by a bearing 61, mounted below the floor or deck of the truck, the said shaft being horizontally disposed and fixedly carrying a bevel-pinion 62, (see Fig. 2,) meshing with a bevel-gear 63, fixed to the lower end of the vertical stub-shaft and fixedly carrying at its upper end a bevel-gear 65, said stub-shaft extending centrally through the bracket and also through the yoke 66, supported by said bracket. It will be evident, therefore, that the yoke 66 is in the nature of a turn-table, as it turns around said stub-shaft. The vertical arms of this yoke 66 rotatively support the shaft 67, to which the bevel-pinion 68 is fastened, the latter meshing with the bevel-gear 65. This turning yoke or body 66 constitutes a part of the secondary conveyer 57, the inner shaft 69 of said conveyer being rotatively supported by the said vertical arms of the yoke. Said shaft 67, which it will be understood is driven through the intermediate gears just described, is connected by sprocket-gearing 70 with the outermost shaft of the secondary conveyer, so as to impart a traveling movement to the latter. By virtue of the driving connections between the shaft 21 and the secondary conveyer 57 it will be evident that the same may be freely turned without affecting the motion of such secondary conveyer.

Referring now to Figs. 9 and 10, where I show a different kind of mechanism for effecting the reciprocation of the draw-bar, which is denoted by 71, said draw-bar is supported exactly like the draw-bar 19, and hence the same characters will be employed to denote similar parts as were used in the other figures. The draw-bar 71, however, is divided at a suitable point in its length, as at 72, and the sheave 73 is supported between the branches of the dividing portion 72, said sheave being connected with the shaft 73' in a manner exactly as the pinion 18 is connected with its shaft. The sheave 73 has a continuous circumferential groove to receive the band 74, the ends of which are connected with the draw-bar at the extremities of the divided portion 72 thereof. When the shaft 73' is oppositely operated, and this is secured by mechanism hereinbefore described, the draw-bar 71 will, through the intermediate sheave and band, be reciprocated. In the modified form of the draw-bar of course the same is sustained by antifriction-rollers 75 instead of pinions, as is the case with the draw-bar having rack-teeth, these rolls 75 being mounted exactly like said pinions and being the equivalents thereof.

In Fig. 11 I have shown another way for reciprocating the draw-bar. Referring to this figure, the shaft 78, which is the equivalent of the shaft 17, sustains for oscillation the depending arms of the yoke 79, the vertical stub-shaft 80 extending centrally through the transverse portion of said yoke and also through the overhanging arm of the bracket 81, fixed to the upper side of said yoke. A channeled guide or boxing 82, having a toothed draw-bar 83, is supported between the overhanging arm of said bracket to the yoke, and the shaft 80 extends through the branches of the said channeled guide or boxing. This stub-shaft rigidly carries between the branches of the guide the pinion 84, meshing with the teeth of the draw-bar 83, and is further provided at its lower end with the bevel-gear 85, suitably fastened thereto and meshing with the bevel-gear 86, fastened to the shaft 78, whereby the pinion can be driven through the intermediate bevel-gears to reciprocate the draw-bar upon the opposite movement of the said shaft 78. The yoke or carrier 79 for the draw-bar can be tilted in any suitable way—for example, by means of the intermeshing sectors 46 and 47. By virtue of the mounting of the parts as shown in Fig. 11 the rack draw-bar can be moved freely laterally within the desired limits without affecting its driving connection with the pinion 84.

It will be evident from the foregoing description that the machine can be moved along a line or battery of coke-ovens and that the contents of the latter can be effectively discharged by the reciprocation of the draw-bar, the coke when it leaves the oven being delivered upon the primary conveyer 56, which takes it to a secondary conveyer 57, and the actuating connections between the motor-shaft and these conveyers will be such that their upper or working runs will be moved in the same direction. The coke carried by the secondary conveyer can be delivered into a railroad-car or upon a dock or any other suitable place within range of the same.

The improved machine is thoroughly effective in operation, and all its mechanisms are within easy control of the operator or operators standing upon the deck or platform of the car or truck 1.

I have termed my improved apparatus a "coke-drawing" machine; but it is not my intention to limit the use of the invention to any particular field, for the machine may be employed with equal advantage for other purposes—for example, for leveling the coke in the ovens. In this case it will not be necessary to provide the machine with conveying mechanism.

Having described the invention, what I claim is—

1. In a machine of the class described, a laterally-movable draw-bar, a shaft, mechanism for oppositely rotating said shaft, a spherical portion fixed to said shaft and a power-transmitting member for actuating said draw-bar, having a spherical seat to receive said spherical portion and rotative with the latter.

2. In a machine of the class described, a laterally movable and tiltable draw-bar, a shaft, mechanism for oppositely rotating said shaft, a spherical portion fixed to said shaft and a power-transmitting member for actuating said draw-bar, having a spherical seat to receive said spherical portion and rotative with the latter.

3. In a machine of the class described, a laterally-movable draw-bar, a shaft, mechanism for oppositely rotating said shaft, a spherical portion fixed to said shaft, and a pinion having a spherical seat to receive said spherical portion and rotative with the latter, said draw-bar having teeth adapted to mesh with those of the pinion.

4. In a machine of the class described, a draw-bar, a guide for said draw-bar, a carrier to which said guide is connected for lateral motion, a shaft, a power-transmitting member for actuating the draw-bar, a spherical portion fixed to said shaft, and the power-transmitting member having a seat shaped to agree with and to receive said spherical portion, and the spherical portion and power-transmitting member being keyed together, mechanism for oppositely rotating said shaft, and means for moving the draw-bar laterally.

5. In a machine of the class described, a draw-bar, a guide for said draw-bar, a carrier to which said guide is pivoted, a power-transmitting member for actuating the draw-bar, a spherical portion fixed to said shaft, and the power-transmitting member having a seat shaped to agree with and to receive said spherical portion, and the latter being keyed to said power-transmitting member, mechanism for oppositely rotating said shaft, and means connected with said shaft for shifting the same.

6. In a machine of the class described, a draw-bar, a guide for said draw-bar, a carrier for the guide, a shaft, a power-transmitting member for actuating the draw-bar, a spherical portion fixed to the shaft, and the power-transmitting member having a seat shaped to agree with and to receive said spherical portion and the latter being keyed to said power-transmitting member, mechanism for oppositely rotating said shaft, means for moving the draw-bar laterally, and wheels supported by said guide for upholding the draw-bar.

7. In a machine of the class described, a laterally-movable draw-bar, a shaft, mechanism for oppositely rotating said shaft, a spherical portion fixed to said shaft, a power-transmitting member for actuating said draw-bar, having a spherical seat to receive said spherical portion and rotative with the latter, a tiltable carrier for said draw-bar, intermeshing gears one of which is connected with said carrier, and means for operating one of said gears.

8. In a machine of the class described, a draw-bar, a tilting carrier for the draw-bar, a pair of intermeshing gears, one of which is connected with said carrier, a hand-lever connected with one of the intermeshing gears for operating the same, a guide or boxing mounted for turning movement and adapted to receive said draw-bar, a hand-lever, and a link connected respectively with said guide or boxing, and the last-mentioned hand-lever by universal joints.

9. In a machine of the class described, a draw-bar, a guide for said draw-bar, a pair of superposed rings connected together and between which said guide is mounted, said rings having projecting sleeves mounted for oscillation, intermeshing gears one of which is fastened to one of said sleeves, means for operating the draw-bar, and means for actuating a gear.

10. In a machine of the class described, a draw-bar, a channeled guide for receiving said draw-bar, mechanism for operating the draw-bar, a pair of superposed rings connected together and between which said guide is located and mounted for oscillation, a strap supported against a ring, a pivot extending through a cross-bar of one of the rings and also through said guide, and mechanism for tilting said carrier.

11. In a machine of the class described, a draw-bar, a guide for said draw-bar, a pair of superposed rings constituting a carrier for the guide and between which the same is mounted for lateral motion, and said rings having projecting sleeves mounted for oscillation, a pair of intermeshing gears one of which is fastened to one of the sleeves, means for tilting the said rings or carrier, and means for moving the guide laterally.

12. In a machine of the class described, a draw-bar mounted for tilting and lateral movements, mechanism for reciprocating the draw-bar, means for tilting said draw-bar, a hand-lever for moving the draw-bar sidewise, and a link connected by universal joints with the draw-bar and hand-lever respectively.

13. In a machine of the class described, a draw-bar, a guide for said draw-bar, a carrier for the guide, the latter being mounted for lateral motion relatively to the carrier, and said carrier being mounted for tilting movement, means for operating the draw-bar, mechanism for tilting said carrier, a hand-lever for moving the guide laterally, and a link connected by universal joints with the guide and hand-lever respectively.

14. In a machine of the class described, a draw-bar, a channeled guide for said draw-bar, a carrier for the guide consisting of a pair of superposed rings between which said guide is mounted for lateral motion and said carrier having projecting sleeves mounted for oscillation, a pair of intermeshing gears one of which is fixed to a sleeve, a hand-lever connected with the other gear, a second hand-lever for operating the draw-bar guide laterally, and a link connected by universal joints to said guide and second hand-lever respectively.

15. In a machine of the class described, a draw-bar, mechanism for reciprocating the same, and primary and secondary conveyers, the primary conveyer being adapted to receive the material discharged from a receptacle by an implement on the draw-bar and deliver the same onto the secondary conveyer, and the secondary conveyer being mounted for lateral motion relatively to the primary conveyer.

16. In a machine of the class described, a draw-bar, mechanism for reciprocating the same, primary and secondary conveyers, the primary conveyer being adapted to receive the material discharged from a receptacle by an implement on the draw-bar and deliver the same onto the secondary conveyer, and the secondary conveyer being mounted for lateral motion relatively to the primary conveyer, a wheeled truck upon which said parts are supported, and mechanism for propelling the truck.

17. In a machine of the class described, a draw-bar, mechanism for reciprocating the same, primary and secondary conveyers, the primary conveyer being adapted to receive the material discharged from a receptacle by an implement on the draw-bar and deliver the same onto the secondary conveyer, and the secondary conveyer being mounted for lateral motion relatively to the primary conveyer, a wheeled truck upon which said parts are supported, and mechanism for propelling the truck, said mechanism including devices for effecting the movement of the truck in opposite directions.

18. In a machine of the class described, a draw-bar, mechanism for reciprocating the same, and a conveyer arranged to receive material from a suitable source, a turn-table to which said conveyer is connected, a shaft supported by the turn-table and having means for operating said conveyer, a second shaft supported independently of the turn-table, driving connections between said shafts, and mechanism for operating the second shaft.

19. In a machine of the class described, a draw-bar, mechanism for reciprocating the same, a conveyer arranged to receive the material discharged from a receptacle by an implement on the draw-bar, a turn-table to which said conveyer is connected, a shaft mounted upon the turn-table and provided with means for driving said conveyer, a second shaft constituting a pivot for the turn-table, intermeshing bevel-gears fixed to said shafts, a third shaft, intermeshing bevel-gears fixed to the second and third shafts, and means for driving the third shaft.

20. In a machine of the class described, a draw-bar, a shaft operatively connected to said draw-bar, a pair of oppositely-rotative power-driven members loosely carried by said shaft, a clutch fixed to said shaft and slidable between said power-driven members and adapted to laterally clutch the same to said shaft, a shipping-lever for the clutch, having oppositely-disposed arms, spring-actuated treadles, levers connected with said treadles, links connected with the oppositely-disposed arms of the shipping-lever, one link being connected to the treadle-lever at a point beyond the fulcrum thereof and the other link being connected to the other treadle-lever at a point between its fulcrum and treadle.

In testimony whereof I have hereunto set my hand in presence of two subscribing witnesses.

BURTON J. MATTESON.

Witnesses:
W. J. MURRAY,
I. D. MILLIKEN.